(12) United States Patent
Robbins (10) Patent No.: US 9,178,353 B2
(45) Date of Patent: Nov. 3, 2015

(54) ACTIVE BYPASS DIODE CIRCUIT AND SOLAR POWER MODULE WITH ARC FLASH MITIGATION FEATURE

(71) Applicant: Steven Andrew Robbins, Calabasas, CA (US)

(72) Inventor: Steven Andrew Robbins, Calabasas, CA (US)

(73) Assignee: Sunfield Semiconductor, Inc., Calabasas, CA (US)

( * ) Notice: Subject to any disclaimer, the term of this patent is extended or adjusted under 35 U.S.C. 154(b) by 205 days.

(21) Appl. No.: 13/851,231

(22) Filed: Mar. 27, 2013

(65) Prior Publication Data

US 2014/0293491 A1 Oct. 2, 2014

(51) Int. Cl.
*H02H 9/04* (2006.01)
*H02H 7/00* (2006.01)
*H02H 7/20* (2006.01)

(52) U.S. Cl.
CPC ............... *H02H 9/041* (2013.01); *H02H 7/00* (2013.01); *H02H 7/20* (2013.01)

(58) Field of Classification Search
CPC ............. H02H 7/00; H02H 7/20; H02H 3/04; H02H 9/041
See application file for complete search history.

(56) References Cited

U.S. PATENT DOCUMENTS

| | | | | |
|---|---|---|---|---|
| 5,502,368 A | * | 3/1996 | Syverson | H02J 7/1438 310/181 |
| 6,452,767 B1 | * | 9/2002 | Brooks | 361/42 |
| 6,633,009 B1 | * | 10/2003 | Shea | 200/61.08 |
| 7,821,749 B2 | | 10/2010 | Asokan et al. | |
| 7,898,114 B2 | | 3/2011 | Schmidt et al. | |
| 7,965,486 B2 | | 6/2011 | Land | |
| 8,040,517 B1 | | 10/2011 | Wu et al. | |
| 8,169,252 B2 | | 5/2012 | Fahrenbruch et al. | |
| 8,618,864 B2 | | 12/2013 | Robbins | |
| 8,649,141 B2 | * | 2/2014 | La Scala et al. | 361/86 |
| 8,837,097 B2 | * | 9/2014 | Zuercher et al. | 361/42 |
| 2004/0027749 A1 | * | 2/2004 | Zuercher et al. | 361/62 |
| 2009/0014050 A1 | | 1/2009 | Haaf | |
| 2010/0002349 A1 | | 1/2010 | La Scala et al. | |
| 2014/0078793 A1 | | 3/2014 | Sivakumar et al. | |

* cited by examiner

*Primary Examiner* — Zeev V Kitov
(74) *Attorney, Agent, or Firm* — Lowry Blixseth LLP; Scott M. Lowry (57) ABSTRACT

An active bypass diode circuit that mitigates the hazard of arc flash events in a Photovoltaic (PV) solar power array, and a PV solar power module that utilizes a plurality of said active bypass circuits are disclosed The active bypass circuit comprises a diode, a switch in parallel with the diode, a control circuit for opening and closing the switch, a circuit for detecting arc flash events, a power management circuit, a power supply circuit, and a capacitor. When an arc flash event is detected, all the switches are closed concurrently, reducing the voltage produced by the PV string to a level that is too low the sustain the arc, and thereby terminating the arc.

21 Claims, 9 Drawing Sheets

ACTIVE BYPASS DIODE CIRCUIT AND SOLAR POWER MODULE WITH ARC FLASH MITIGATION FEATURE

This application claims priority from U.S. Provisional Patent Application No. 61/617,335, filed on 29 Mar. 2012.

BACKGROUND

The invention relates generally to the field of photovoltaic (PV) solar power systems, and more specifically to circuits for protecting bypass diodes from overheating under partial shading conditions, and protecting human personnel from arc flash hazards.

Figure 1:
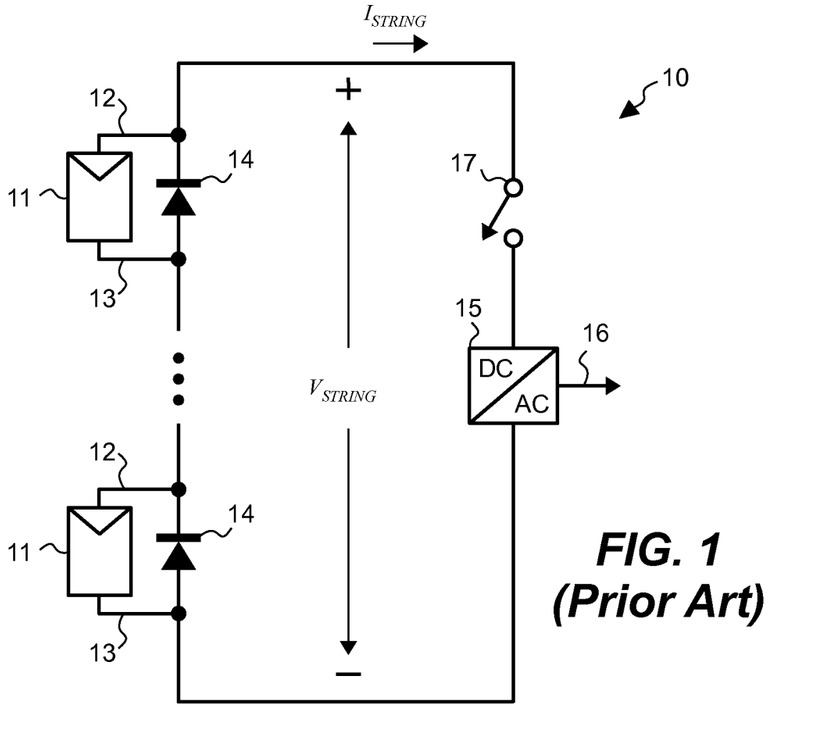
FIG. 1 is a high level block diagram of a conventional photovoltaic solar power system.

FIG. 1 is a high level block diagram of a conventional PV solar power system 10 including a plurality of PV segments 11 connected in series. Each PV segment 11 comprises a plurality of PV cells that are serially connected between a positive terminal 12 and a negative terminal 13. For example, a typical PV segment includes twenty four PV cells, and produces about 12V between 12 and 13 in full sunlight. So a typical string of twenty four to fifty one serially-connected PV segments 11 produces an output voltage ($V_{STRING}$) in the range of 288V to 612V. An inverter 15 converts $V_{STRING}$ from dc to ac and has an output 16 for coupling to the electric power grid. There is also usually a disconnect switch 17 for shutting down the system 10.

Since the PV segments 11 are connected in series, the current ($I_{STRING}$) is the same in each segment. Therefore, when one segment is shaded (e.g., by a tree branch, or chimney) it acts like a bottleneck, restricting current flow in the entire string. The unshaded PV segments try to force current flow through the shaded segment, resulting in the shaded segment becoming reverse-biased. But a reverse-biased PV cell dissipates energy instead of producing energy, so the shaded segment gets hot, and can even be permanently damaged. The well known remedy is to include bypass diodes 14 that allow current to flow around the shaded PV segments, rather than through them. Thus, the bypass diodes 14 protect the PV segments from damage due to reverse bias, and also avoid a serious reduction in system 10 efficiency when the string is partially shaded.

A potential problem in PV systems, such as 10, is overheating in the bypass diodes 14. For example, assume the string current ($I_{STRING}$) is 11 Amps, but the short-circuit output current of one of the PV segments 11 is only 1 Amp, due to shading. This means the current in the bypass diode 14 connected in parallel to the shaded segment is 10 Amps. If the forward voltage drop of the bypass diode 14 is 0.5V at 10 A, then the heat dissipation in the bypass diode is 5 W. A typical junction box affixed to the back side of a solar power module contains three bypass diodes. Therefore, in this example, the heat dissipation inside the junction box could be up to 15 W. What is more, such junction boxes are typically relatively small, made of plastic that conducts heat poorly, and have no ventilation holes because they must keep out moisture. Consequently the junction temperatures of the bypass diodes 14 can easily exceed 180° C. under these conditions. Such high junction temperatures shorten the expected life span of the bypass diodes.

One solution for reducing heat dissipation, well known to those of ordinary skill in the art, is to use an active bypass diode circuit. There are many examples of such circuits in the prior art such as: U.S. Patent Application Publication number 2010/0002349 (La Scala, et al), U.S. Pat. No. 7,898,114 (Schmidt, et al), and U.S. Patent Application Publication number 2009/0014050 (Haaf).

Figure 2:
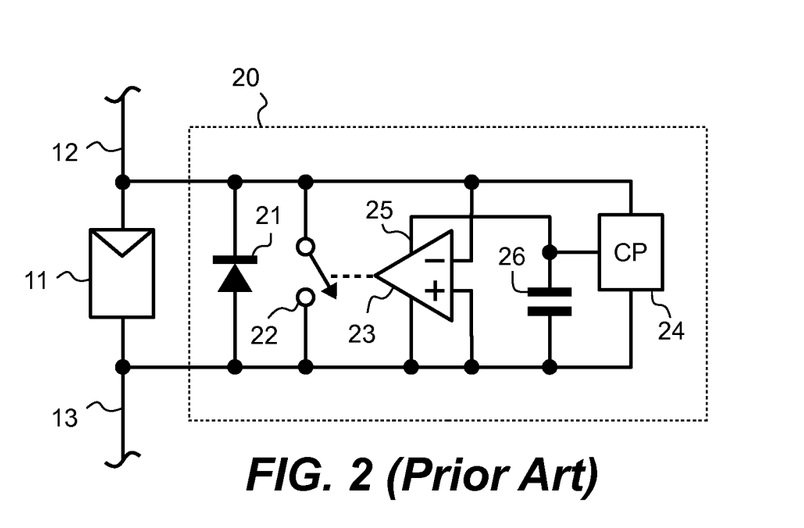
FIG. 2 is a high level block diagram of a conventional active bypass diode circuit.

FIG. 2 is a high level block diagram that is typical of such prior art, showing an active bypass diode circuit 20 comprising: a bypass diode 21, a switch 22, a control circuit 23, a charge pump circuit 24, and a capacitor 26. When the PV segment 11 is partially shaded, current initially flows through the bypass diode 21. The control circuit 23 senses the resulting positive voltage from the diode's anode 13 to it's cathode 12, and closes the switch 22, thereby reducing power dissipation. When the PV segment 11 is unshaded, the control circuit 23 senses a negative anode-to-cathode voltage and opens the switch 22 again. The switch 22 is typically a metal-oxide-semiconductor field-effect transistor (MOSFET) with an on-resistance of about 5 m$\Omega$. At 10 A, the power dissipation in a junction box containing three such active bypass diode circuits would be approximately 1.5 W, or about 90% less than with conventional bypass diodes.

Another problem with a conventional PV system, such as 10, is safety for installer personnel and firefighters. The electrocution hazard for a PV array is much greater than with ordinary 120V ac wiring found in the typical American home, mainly because the voltage is dc. But in addition to the increased danger of electrocution, there is also a lesser-known danger from arc flashes. An electrical arc is an ongoing plasma discharge caused by current flow through a normally non-conductive medium, such as air. With ac power systems, you get a spark when you open a circuit—a spark is a very brief arc—but with dc power systems, the arc can be continuous, and therefore the temperature quickly reaches thousands of degrees, which is why electrical arcs are used for welding. According to OSHA there are approximately 2000 injuries in the U.S. each year related to arc flashes. Statistics on how many of these injuries are in the PV solar industry are not available at the time of this writing, but it can be assumed the number is not insignificant because solar workers typically have much less safety training and equipment compared to their counterparts at electrical utilities.

Systems for suppressing, or mitigating arc flashes in PV solar systems already exist. For example, many companies now make products called dc power optimizers that automatically shut off when a cable is disconnected. However, these products perform many other functions besides arc flash mitigation, and are relatively very expensive.

Therefore, there is a need in the solar power industry for a low-cost active bypass diode circuit and solar power module that not only reduces heat dissipation under partial shading conditions, but also mitigates arc flash hazards for installers and firefighters.

SUMMARY

The active bypass circuit and solar power module disclosed herein have the ability to mitigate an arc flash, thereby reducing risk of injury to installer or firefighter personnel.

The active bypass circuit disclosed herein, utilizes a solid state switch to dramatically reduce heat dissipation compared to conventional passive bypass diodes; however, the solid state switch is also used for a second, and novel purpose of mitigating arc flashes. At the beginning of an arc flash event the switch is closed. If all the PV solar power modules in a string also include active bypass circuits as disclosed herein, then all the switches will close nearly simultaneously, and the voltage output of the entire string will be reduced to nearly zero, thereby terminating the arc flash.

The solar power module disclosed herein includes a plurality of active bypass circuits with arc flash mitigation capability. Several embodiments of the solar power module are disclosed.

Other features and advantages of the present invention disclosed herein will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION

Figure 3:
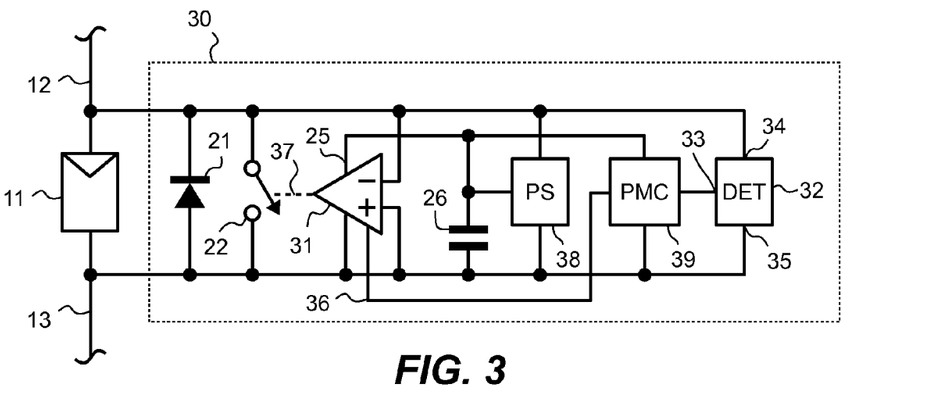
FIG. 3 is a high level block diagram of an active bypass diode circuit with arc flash mitigation.

FIG. 3 is a high level block diagram of an active bypass circuit 30 with arc flash mitigation capability, comprising: a bypass diode 21; a switch 22; a control circuit 31; a detection circuit 32; a power management circuit 39; a power supply circuit 38; and a capacitor 26.

Figure 4:
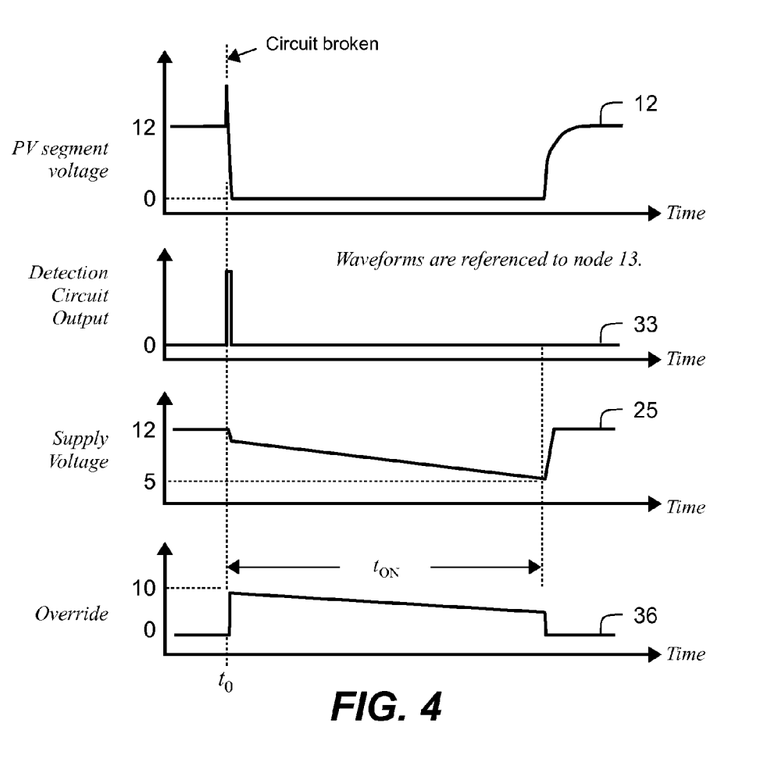
FIG. 4 shows waveforms illustrating an example of how the present invention mitigates arc flash events.

FIG. 4 shows example waveforms to help explain how the active bypass circuit 30 mitigates an arc flash. In FIG. 4 all voltage waveforms are referenced to the most negative node 13. Initially, the PV segment 11 is unshaded, and produces an output voltage (top waveform in FIG. 4) of about 12V. The power supply 38 utilizes this voltage to charge the capacitor 26, and supply power to at least the control circuit 31 and the power management circuit 39.

At $t=t_0$ the PV string is broken by disconnecting or cutting a cable. This triggers an arc flash, and in response the detection circuit 32 sets it's output 33 high. The power management circuit 39 receives the detection signal 33 and in response sets it's override output 36 high, causing the control circuit 31 to close the switch 22.

Thus, the power management circuit 39, and the control circuit 31 constitute a means for closing the switch 22 in response to the detection circuit 32 detecting the start of an arc flash event.

When the switch 22 closes, it short-circuits the PV segment 11, so the power supply circuit 38 no longer has enough input voltage to operate, and it shuts down. But the energy stored in the capacitor 26 continues to power at least the control circuit 31 and the power management circuit 39 for a time interval ($t_{ON}$).

The $t_{ON}$ time interval ends when the power management circuit 39 sets the override line 36 low, thereby enabling the control circuit 31 to open the switch 22 again. Once the switch 22 is open, the power supply 38 is able to recharge the capacitor 26 from the PV segment 11, and the active bypass circuit 30 is ready to mitigate the next arc flash.

During the $t_{ON}$ time interval the supply voltage 25 slowly ramps down as the capacitor 26 is discharged. In a first embodiment of the power management circuit 39, the override output 36 is set low when the supply voltage 25 falls below a predetermined voltage threshold, typically 5V. A second embodiment of the power management circuit 39 includes a timer circuit that starts timing at $t=t_0$ and then sets the override output 36 low after a predetermined time interval.

It is desirable for the time interval to be at least 200 ms long. For example, if a person disconnects a cable, the arc flash is initiated the instant the connectors break contact, but it may take as long as 200 ms for the two connectors to separate far enough, about 5 mm, to prevent a new flash from occurring when the switches 22 open again.

Figure 5:
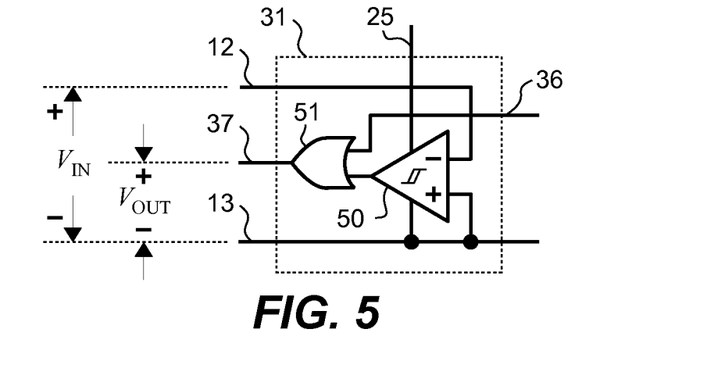
FIG. 5 is a high level block diagram showing more details of the control circuit.

FIG. 5 shows a simplified schematic of the control circuit 31 comprising a voltage comparator 50 and a logic OR-gate 51. The control circuit's output 37 closes the switch 22 when high, and opens the switch when low. Therefore, when the override input 36 is high during an arc flash event, the switch 22 is closed. But when the override input 36 is low, the control circuit opens and closes the switch 22 in response to changes in voltage polarity between 12 and 13.

Figure 6:
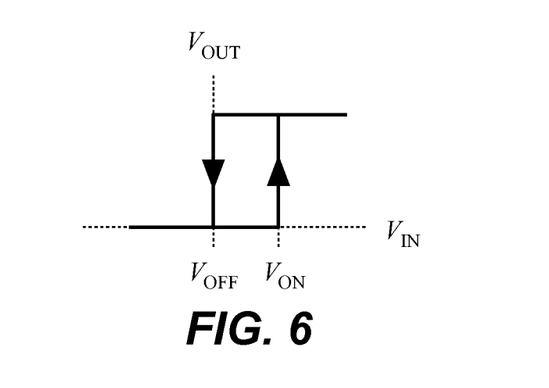
FIG. 6 is a graph depicting an example of hysteresis in the control circuit.

The voltage comparator 50 is typically designed to include hysteresis, to avoid problems with oscillations. FIG. 6 shows an example of hysteretic behavior. When the comparator's input voltage ($V_{IN}$) increases to a first predetermined threshold level ($V_{ON}$) the output of the comparator ($V_{OUT}$) goes high, turning on the switch 22. Typically, $V_{ON}$ is chosen to be about 200 mV since the forward voltage drop through the diode 21 is at least 300 mV, even at just a few milliamps. Thus, the switch 22 is guaranteed to close before the forward current becomes large. But once the switch 22 is closed, it has a very small resistance, typically only about 5 mΩ, and thus the voltage between 12 and 13 instantly drops to nearly zero. If $V_{ON}$ was the comparator's only threshold, it would then turn the switch off, completing an on/if cycle that would then repeat. The second predefined voltage threshold level ($V_{OFF}$) is included to prevent such oscillations. Typically, $V_{OFF}$ is about −200 µV. Therefore, when the current through the switch is 200 µV/5 mΩ=40 mA in the reverse direction (from cathode 12 to anode 13) the comparator's input voltage drops below the second threshold $V_{OFF}$ and the switch 22 is opened.

Thus, the voltage comparator 50 constitutes a means for closing the switch 22 in response to the anode-to-cathode voltage being relatively greater than the first predetermined threshold ($V_{ON}$) and opening the switch in response to the anode-to-cathode voltage being relatively lesser than the second predetermined threshold ($V_{OFF}$).

Another key difference between the present invention and prior art is how power is provided to the control circuit 31. In the prior art (e.g. La Scala, Schmidt, and Haaf) the charge pump 24 provides power only when the PV segment 11 is shaded. In contrast, the active bypass circuit 30 disclosed herein requires power even when the PV segment 11 is unshaded, so that it can respond instantly to an arc flash event.

Figure 7:
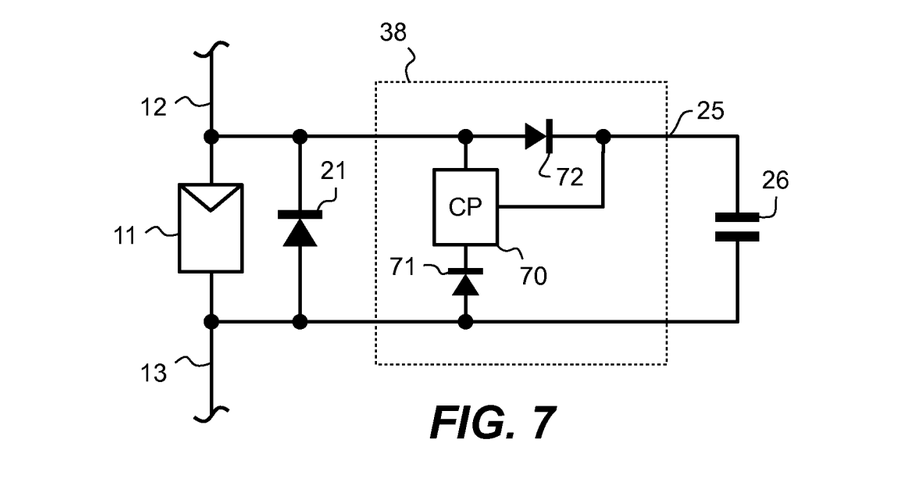
FIG. 7 is a simplified schematic of first embodiment of the power supply circuit.

The control circuit 31 and power management circuit 39 require a supply voltage 25 that is typically 5V to 12V, and the power supply circuit 38 provides it. The detection circuit 32 typically draws power from it's inputs 34 and 35, and thus does not need power from the power supply circuit 38. FIG. 7 shows a simplified schematic of a first embodiment of the power supply circuit 38, comprising a charge pump 70 and two diodes. When the PV segment 11 is shaded, current flows through the bypass diode 21 producing a voltage typically greater than 300 mV from anode 13 to cathode 12. This small voltage starts up the charge pump 70 via the first diode 71, and then the charge pump produces about 5V on the supply rail 25 to charge the capacitor 26. When the control circuit 31 turns on the switch 22, the input voltage to the charge pump 70 drops to nearly zero, and so the charge pump shuts off. The energy stored in the capacitor 26 allows the control circuit 31 to continue operating for a while with the switch 22 closed, and then it shuts down, which opens the switch, and the process repeats. This periodic pulsing behavior is typical of active bypass circuits for PV systems as described in the prior art. However, the present invention advantageously includes a second diode 72 that keeps the capacitor 26 charged when the PV segment 11 is not shaded, so that the active bypass circuit 30 circuit is ready to mitigate an arc flash when it occurs.

Another key aspect of the present invention is the detection circuit 32. Many commercially available products, such as Arc Fault Circuit Interrupters (AFCI) detect an arc by looking for a characteristic noise signature. The current flow in an arc is random, and generally has a spectral amplitude that is inversely proportional to frequency, commonly referred to as a "1/f" or "pink" noise spectrum. AFCI works by recognizing this characteristic 1/f noise spectrum in the current flow. But an arc flash always begins with a voltage transient because of a sudden break in a circuit. Therefore, a simple method for detecting an arc flash is to look for the voltage transient produced by the initiation of the arc flash, rather than the 1/f noise.

Figure 8:
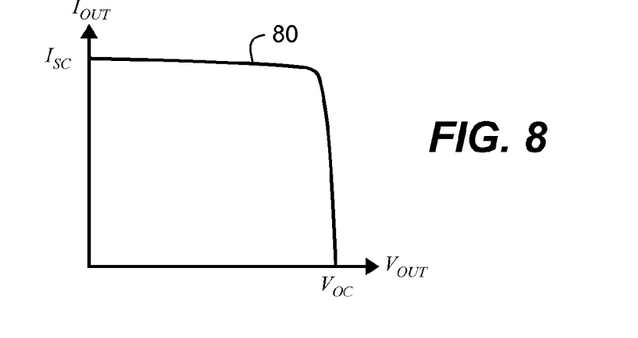
FIG. 8 is an example of a current-versus-voltage curve produced by a segment of PV cells.

To describe the operation of the detector circuit 32 we begin by constructing an equivalent circuit of the PV segment 11. FIG. 8 shows a typical example of a characteristic I/V curve of a PV segment. The I/V curve 80 has two defining parameters: the short-circuit current $I_{SC}$; and the open-circuit voltage $V_{OC}$. Both these parameters vary as a function of the light intensity on the PV cells.

Figure 9:
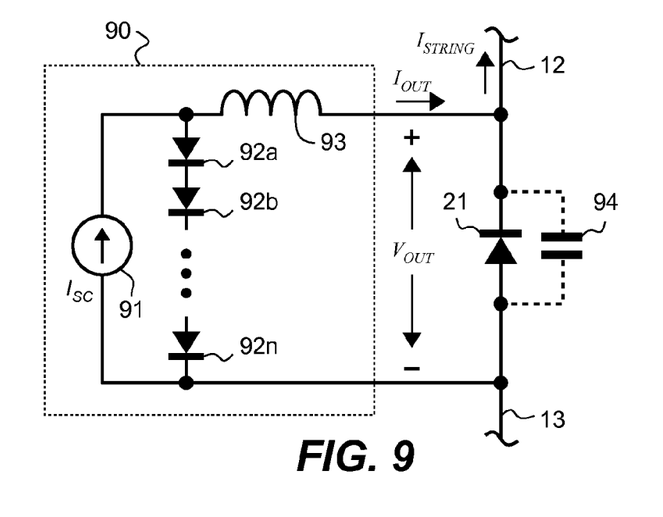
FIG. 9 is an equivalent circuit of a segment of PV cells connected in parallel with a bypass diode.

FIG. 9 shows an equivalent circuit 90 that is commonly used to model PV segments such as 11. The equivalent circuit 90 is similar to the classic Norton circuit that is well known in basic circuit theory. The I/V curve of 90 has end-points that match the end-points of 80 because: when a short circuit is placed between 12 and 13, $V_{OUT}$=0 and $I_{OUT}$=$I_{SC}$; and when $I_{STRING}$=0, all of $I_{SC}$ flows into the string of diodes 92a-92n producing $V_{OUT}$=$V_{OC}$. However, unlike a Norton circuit, the equivalent circuit 90 is nonlinear because of the serially-connected diodes 92a-92n which define the I/V curve between the end-points, such that it closely matches the shape of 80. The equivalent circuit 90 also includes a series-inductance 93 that models the loop inductance resulting from the physical arrangement on the PV cells on the surface of the solar power module. This inductance 93 is typically in the range of 1 μH to 4 μH. FIG. 9 also shows a bypass diode 21 with parasitic capacitance 94.

Under normal sunlight conditions, the bypass diode 21 is reverse biased, and $I_{OUT}$ equals $I_{STRING}$. But when the string current is interrupted, for example by a cable being disconnected, the current through the inductor 93 cannot change instantaneously, so $I_{OUT}$ flows into the parasitic capacitance 94. Then, because the inductance 93 and capacitance 94 form a resonant tank circuit, $V_{OUT}$ rings as shown in the example waveform in FIG. 10, where $I_{STRING}$ is interrupted at time $t_0$.

Figure 10:
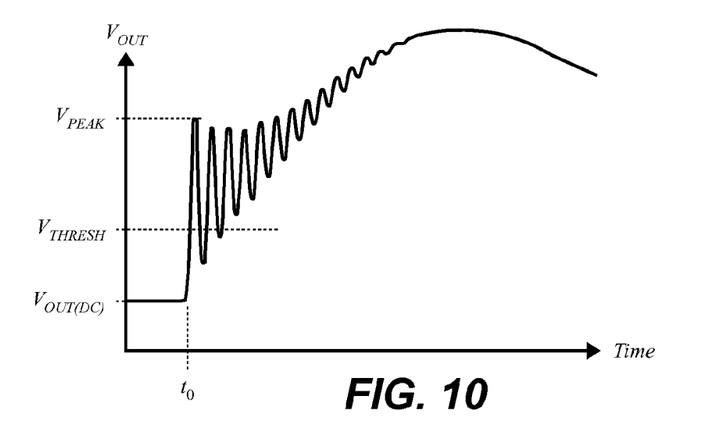
FIG. 10 is an example waveform of a voltage transient resulting from a sudden break in the PV string.

It will be readily apparent to one of ordinary skill in the art how an arc flash event can be detected from the waveform shown in FIG. 10. First, an arc flash event can be detected simply by determining when $V_{OUT}$ exceeds a predefined level threshold $V_{THRESH}$ that is typically chosen to be about 1.3 times the maximum dc output voltage of the PV segment $V_{OUT(DC)}$, because the first transient voltage peak $V_{PEAK}$ is typically about twice $V_{OUT(DC)}$. Second, an arc flash event can also be detected when the slope of $V_{OUT}$ exceeds a predefined rate-threshold that is typically about 10V/μs. The resonant frequency of the LC tank is typically in the range of 3 MHz to 4 MHz, so the slope ($dV_{OUT}/dt$) usually well exceeds 10V/μs. A combination of the two detection methods, utilizing both level and slope thresholds, can also be used.

Figure 11A:
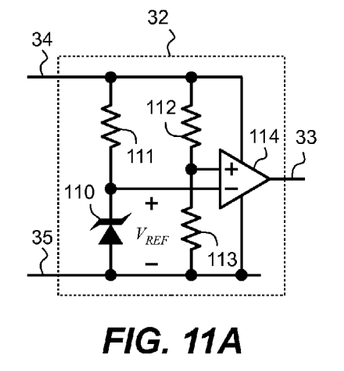
FIG. 11A is a simplified schematic of a first embodiment of the detector circuit.

FIG. 11A is a simplified schematic of a first embodiment of the detector circuit 32 that has a positive input 34, a negative input 35, and an output 33. This first embodiment of the detector circuit 32 looks for the voltage between the inputs to exceed a predetermined threshold level. Many variations of this circuit will be readily apparent to one of ordinary skill in the art. A reference device 110 is used to provide a relatively stable reference voltage $V_{REF}$. In this example the reference device 110 is a zener diode, but the reference device 110 may alternatively be any of the commonly used types of voltage references such as: a band gap reference, a MOSFET threshold reference, or a $V_{BE}$ reference. A bias resistor 111 is used to provide current to the reference device 110, but a current source is often used for the same purpose. Two resistors 112 and 113 are selected to divide the input voltage down by a factor of $V_{THRESH}/V_{REF}$. Therefore, the voltage comparator's output 33 is high when the input voltage exceeds $V_{THRESH}$, and low otherwise.

Thus, the circuit in FIG. 11A constitutes a means for the detection circuit 32 to determine when the anode-to-cathode voltage is relatively greater than a third predetermined threshold ($V_{THRESH}$).

Figure 11B:
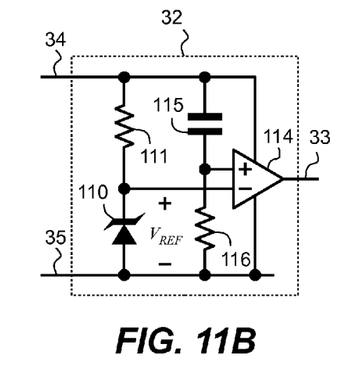
FIG. 11B is a simplified schematic of a second embodiment of the detector circuit.

FIG. 11B is a simplified schematic of a second embodiment of the detection circuit 32 that utilizes a slope threshold. The voltage divider of FIG. 11A is replaced by a differentiator, formed by a resistor 116 and capacitor 115. Typically 115 and 116 are chosen for an RC time constant that is relatively smaller than the resonant period of the LC tank circuit 93-94; therefore, the current in the capacitor 115 will be approximately proportional to the rate of change, or slope of the input voltage between 34 and 35. And the comparator 114 signals that an arc flash is detected when this current multiplied by the resistance of 116 exceeds $V_{REF}$. Many variations of this circuit will also be readily apparent to one of ordinary skill in the art. For example, the R/C differentiator may alternatively be constructed with a classic opamp differentiator circuit.

Thus, the circuit in FIG. 11B constitutes a means for the detection circuit 32 to determine when the anode-to-cathode changes at a rate that is relatively greater than a forth predetermined threshold.

Having fully described the operation of the individual active bypass circuit 30, we now disclose the solar power module and it's various embodiments. FIGS. 12-16 each shows a solar power module comprising three active bypass circuits; however, it will be obvious to one of ordinary skill in the art that these diagrams can be expanded to any number of bypass circuits.

Figure 12:
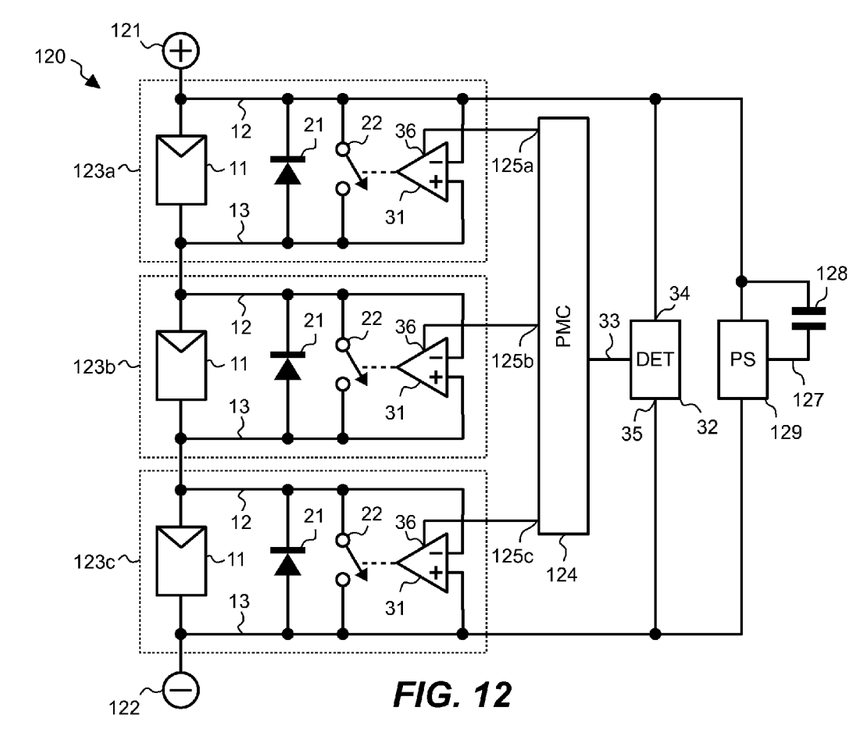
FIG. 12 is a high level block diagram of a first embodiment of a solar power module with arc flash mitigation.

FIG. 12 is a high level block diagram showing a first embodiment of a PV solar power module 120 with arc flash mitigation capability, comprising: a positive power terminal 121 and a negative power terminal 122 for coupling the PV solar power module 120 to a solar power array; a plurality of PV subunits 123a-123c serially connected between the positive and negative power terminals; a detection circuit 32; a power management circuit 124; a capacitor 128; and a power supply circuit 129. Furthermore, each PV subunit 123a-123c comprises: a PV segment 11; a diode 21 coupled in parallel with the PV segment; a switch 22 coupled in parallel with the diode; and a control circuit 31 for opening and closing the switch 22.

In this first embodiment 120 a single detection circuit 32 looks at the voltage across the entire solar power module, from the positive terminal 121 to the negative terminal 122, rather than the voltage across individual bypass diodes 21. This works because each PV segment 11 not only has self-inductance 93, as shown previously in the equivalent circuit 90, but also has mutual inductance with the neighboring PV segments within the same solar power module. The mutual inductance causes the resonant frequencies of the individual PV segments to merge into a single resonant frequency for the whole solar power module, and thus the voltage waveform between nodes 121 and 122 still looks approximately like FIG. 10, but multiplied in magnitude by the number of PV segments 11.

Thus, when the detection circuit in FIG. 11A is used in the first embodiment of the solar power module 120, it constitutes a means for determining when the voltage between the positive power terminal 121 and the negative power terminal 122 is relatively greater than the third predetermined threshold ($V_{THRESH}$). And, when the detection circuit in FIG. 11B is used in the first embodiment of the solar power module 120, it constitutes a means for determining when the voltage between the positive power terminal 121 to the negative power terminal 122 changes at a rate that is relatively greater than the forth predetermined threshold.

The operation of 120 is essentially the same as the individual active bypass circuit 30, but some details require further explanation First, the power supply circuit 129 produces a supply voltage 127 that powers all the control circuits 31 and the power management circuit 124; however, the supply voltage 127 connections to these subcircuits are not shown in FIG. 12 for the sake of simplicity. But the supply voltage connections are shown later in FIG. 16. Second, the power management circuit 124 has multiple outputs 125a-125c—one for each PV subunit 123a-123c—that operate in unison, so that all the control circuits 31 close their switches 22 at the same time.

Figure 13:
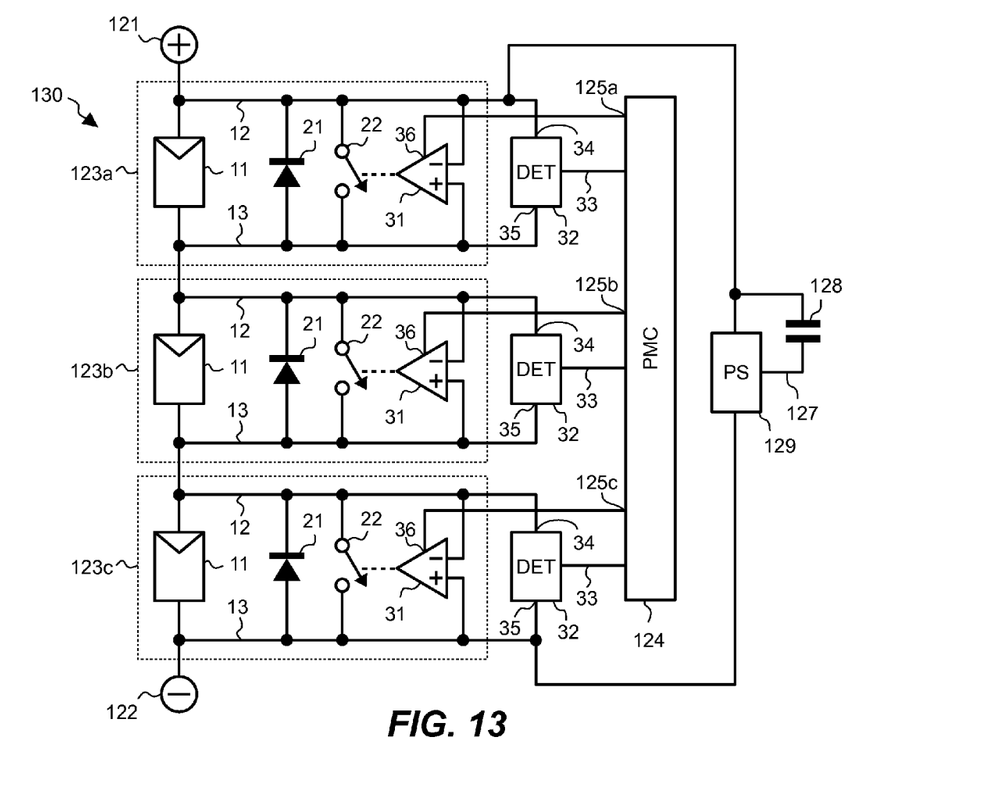
FIG. 13 is a high level block diagram of a second embodiment of a solar power module with arc flash mitigation.

FIG. 13 is a high level block diagram showing a second embodiment of the solar power module 130 with arc flash mitigation capability. This second embodiment 130 differs from the first embodiment 120 by including a plurality of detection circuits 32 instead of just one, where each detection circuit is coupled to one of the plurality of photovoltaic subunits 83a-83c.

Thus, when the detection circuit in FIG. 11A is used in the second embodiment of the solar power module 130, it constitutes a means for determining when the anode-to-cathode voltage in at least one photovoltaic subunit is relatively greater than a third predetermined threshold ($V_{THRESH}$). And, when the detection circuit in FIG. 11B is used in the second embodiment of the solar power module 130, it constitutes a means for determining when the anode-to-cathode voltage in at least one photovoltaic subunit changes at a rate that is relatively greater than the forth predetermined threshold.

Figure 14:
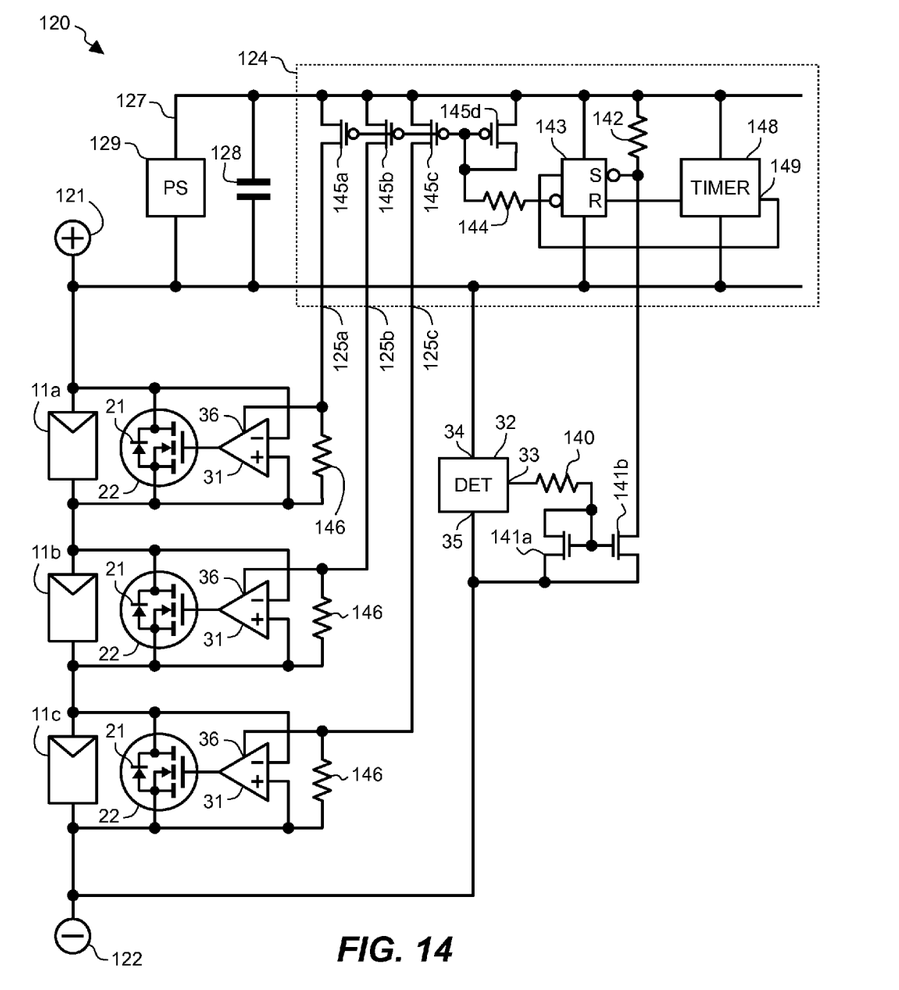
FIG. 14 shows a simplified schematic diagram disclosing more details of the first embodiment of a solar power module with arc flash mitigation.

FIG. 14 is a simplified schematic diagram that discloses more details about the first embodiment 120 of the solar power module. In this example, the switches 22 are implemented as Metal-Oxide-Semiconductor field-effect Transistors (MOSFETs), and the bypass diodes 21 are the integral body diodes that are part of the MOSFETs. However, the switches 22 could alternatively be implemented with Isolated-Gate Bipolar Transistors (IGBTs) or Junction field-effect Transistors (JFETs).

The power supply 129 and capacitor 128 are coupled to the positive power terminal 121 so that the supply rail 127 is raised to a voltage typically 12V to 18V above positive 121. This is necessary because the MOSFET switches 22 require 5V to 10V gate-to-source in order to be fully enhanced, and provide the lowest on-resistance. When the solar power module is fully shaded, all the switches 22 will be closed concurrently, and the positive terminal 121 will be essentially shorted to the negative terminal 122. The only way to provide the required gate-to-source voltage in this case is if the supply rail 127 is above the positive terminal 121.

The detection circuit 31 utilizes a current mirror consisting of 140, 141a, and 141b to convey it's output signal 33 up to the power management 124. When an arc flash begins, 33 goes high relative to 35, so current flows from 33 to 35 via 140 and 141a, resulting in an equal current flow in 141b, and the pull-up resistor 142. This sets the flip-flop 143, causing current to flow down through another resistor 144. And another current mirror—comprising 145a-145d—sends current down to the pull-down resistors 146. This makes the override input 36 to each control circuit 31 go high, causing the control circuits 31 to turn on the MOSFET switches 22 concurrently, and thereby mitigating the arc flash.

FIG. 14 shows a first embodiment of the power management circuit 124 wherein a timer 148 is used to determine when to end the $t_{ON}$ time period. The timer's enable input 149 is set high when the flip-flop 143 is set by the detection circuit 32. After some predetermined time period the timer's output resets the flip-flop 143, thereby terminating the $t_{ON}$ time period, and allowing the switches 22 to open again after an arc flash event.

Figure 15:
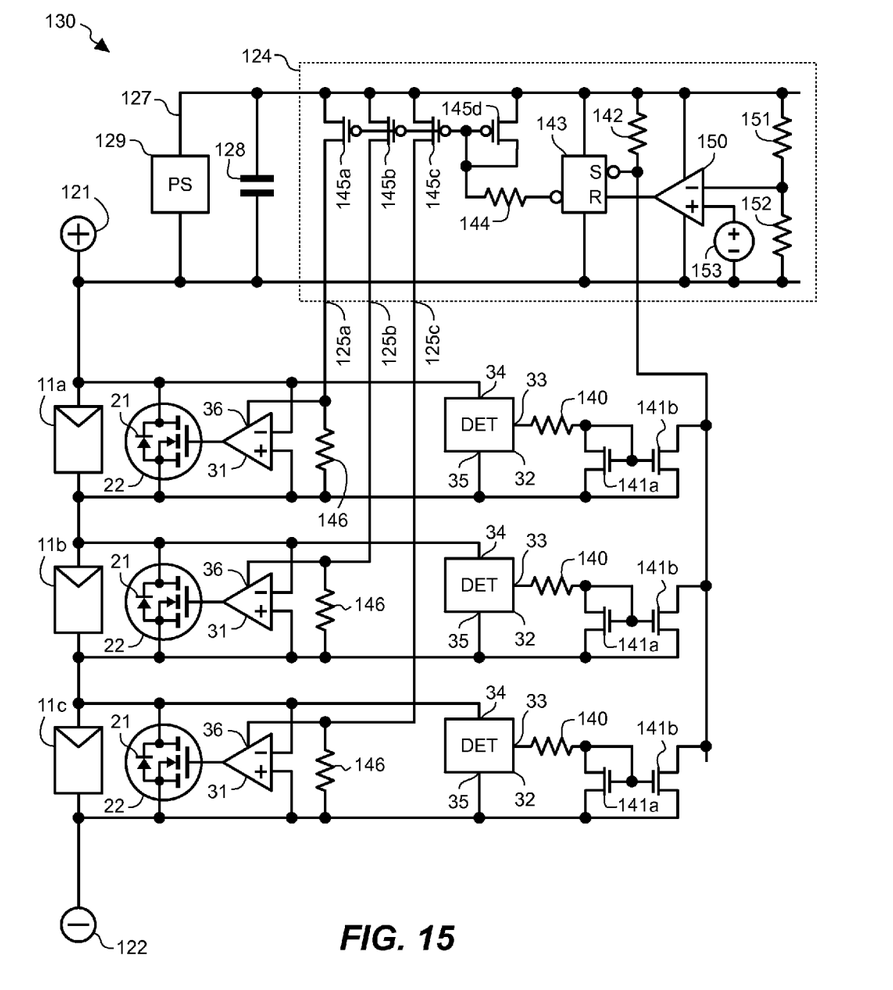
FIG. 15 shows a simplified schematic diagram disclosing more details of the second embodiment of a solar power module with arc flash mitigation.

FIG. 15 is a simplified schematic diagram that discloses more details about the second embodiment 130 of the solar power module. As stated previously, the difference between the two embodiments 120 and 130 is the number of detection circuits 31. In FIG. 15 each PV segment 11a-11c has an associated detection circuit 32, and a current mirror comprising 140, 141a, and 141b. The outputs of the current mirrors are tied together, such than the flip-flop 143 will be set if at least one detection circuit 32 is triggered by an arc flash event.

FIG. 15 shows a second embodiment of the power management circuit 124 wherein a comparator 150, reference 153, and voltage divider 151-152 are used to determine when to end the $t_{ON}$ time period. When the voltage on the capacitor 128 falls below a threshold defined by the reference 153 and voltage divider 151-152, the flip-flop 143 is reset, thereby terminating the $t_{ON}$ time period, and allowing the switches 22 to open again after an arc flash event.

Thus, the comparator 150, reference 153, and resistors 151-152 constitute a means for the power management circuit 124 to determine when the voltage across the capacitor 128 is relatively lesser than the fifth predetermined threshold.

The two embodiments of the power management circuit 124 are interchangeable; either can be used in either 120 or 130.

Figure 16:
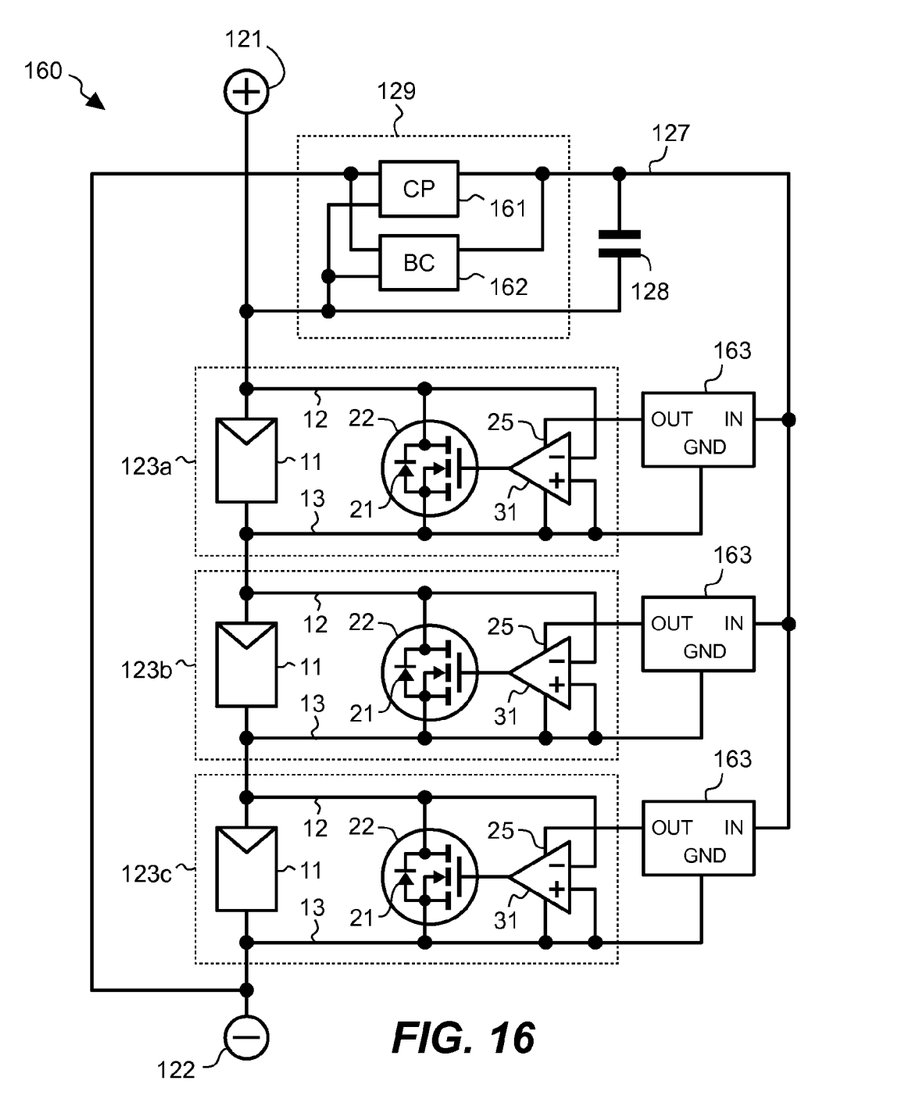
FIG. 16 is a simplified schematic that discloses further details of the first and second embodiments of the solar power module with arc flash mitigation.

FIG. 16 is a simplified schematic showing additional details of a solar power module 160 with arc flash mitigation capability. The module 160 can be of either the first 120 or second 130 embodiments described above. To keep FIG. 16 simple, the detector circuits and power management circuit are omitted.

FIG. 16 shows a second embodiment of the power supply circuit 129 comprising a charge pump 161 and a boost converter 162. The combination of these two different types of converters allows the capacitor 127 to stay charged at all times. The charge pump 161 is for normal mode wherein at least one of the PV segments 11 is unshaded, and the boost converter 162 is used only for fully-shaded mode, wherein all PV segments 11 are shaded concurrently.

In normal mode, at least one of the PV segments 11 is not shaded, so at least one of the switches 22 is open, and the negative terminal 122 will be −8V to −12V with respect to the positive terminal 121. The charge pump 161 inverts this negative input voltage and produces the supply rail 127, which is positive with respect to the 121.

In fully-shaded mode, all the switches 22 are closed about 95% of the time to reduce heat dissipation, but periodically the switches are opened briefly to allow the boost converter 162 to recharge the capacitor 128. This is similar to the pulsing behavior described in the prior art (La Scala, Schmidt, and Haaf). But the present invention advantageously opens the switches 22 in unison, so the string current flows through all the bypass diodes 21. This makes the negative terminal 122 a few diode-drops higher than the positive terminal 121, providing the input voltage needed to start up the boost converter 162. The boost converter 162 recharges the capacitor 128, and once the supply voltage 127 rises above another threshold, typically 18V, the voltage regulators 160 are enabled again.

Although several embodiments have been described in detail for purposes of illustration, various modifications may be made to each without departing from the scope and spirit of the invention. Accordingly, the invention is not to be limited, except as by the appended claims.

What is claimed is:

1. An active bypass diode circuit for photovoltaic solar power modules comprising:
   a diode having anode and cathode terminals, for bypassing at least one photovoltaic cell in a solar power module;
   a switch coupled in parallel with the diode;
   a control circuit for opening and closing the switch;
   a detection circuit for detecting a voltage transient across the diode;
   a power management circuit for determining when to open the switch after the voltage transient;
   a capacitor for storing energy; and
   a power supply circuit disposed to receive power from at least one photovoltaic cell in the solar power module, and provide power to at least the capacitor, the control circuit, and the power management circuit.

2. The active bypass diode circuit of claim 1, wherein the switch is selected from the group consisting of a metal-oxide-semiconductor field-effect transistor, an isolated-gate bipolar transistor, and a junction field-effect transistor.

3. The active bypass diode circuit of claim 2, wherein the diode is an integral part of the switch.

4. The active bypass diode circuit of claim 1, including a means for closing the switch in response to the anode-to-cathode voltage being relatively greater than a first predetermined threshold, and opening the switch in response to the anode-to-cathode voltage being relatively lesser than a second predetermined threshold.

5. The active bypass diode circuit of claim 1, including a means for closing the switch in response to the detection circuit detecting the voltage transient.

6. The active bypass diode circuit of claim 1, wherein the detection circuit includes a means for determining when the anode-to-cathode voltage is relatively greater than a third predetermined threshold.

7. The active bypass diode circuit of claim 1, wherein the detection circuit includes a means for determining when the anode-to-cathode voltage changes at a rate that is relatively greater than a fourth predetermined threshold.

8. The active bypass diode circuit of claim 1, wherein the power management circuit comprises a timer circuit for determining when to open the switch after the voltage transient.

9. The active bypass diode circuit of claim 1, wherein the power management circuit comprises a means for determining when the voltage across the capacitor is relatively lesser than a fifth predetermined threshold.

10. A photovoltaic solar power module, comprising:
    a positive power terminal and a negative power terminal for coupling the photovoltaic solar power module to a solar power array;
    a plurality of photovoltaic subunits serially connected between the positive power terminal and the negative power terminal, each photovoltaic subunit comprising:
       a plurality of serially-connected photovoltaic cells for converting light into electricity,
       a diode having anode and cathode terminals, the diode coupled in parallel with the plurality of serially-connected photovoltaic cells,
       a switch coupled in parallel with the diode, and
       a control circuit for opening and closing the switch;
    at least one detection circuit for detecting a voltage transient across at least one of the diodes;
    a power management circuit for determining when to open the switches after the voltage transient;
    an capacitor for storing energy; and
    a power supply circuit disposed to receive power from at least one of the serially-connected photovoltaic cells, and provide power to at least the capacitor, the control circuits in the plurality of photovoltaic subunits, and the power management circuit.

11. The photovoltaic solar power module of claim 10, wherein the switch is selected from the group consisting of a metal-oxide-semiconductor field-effect transistor, an isolated-gate bipolar transistor, and a junction field-effect transistor.

12. The photovoltaic solar power module of claim 11, wherein the diode is an integral part of the switch.

13. The photovoltaic solar power module of claim 10, wherein the each photovoltaic subunit includes a means for closing the switch in response to the anode-to-cathode voltage being relatively greater than a first predetermined threshold, and opening the switch in response to the anode-to-cathode voltage being relatively lesser than a second predetermined threshold.

14. The photovoltaic solar power module of claim 10, including a means for closing the switch in each photovoltaic subunit in response to at least one detection circuit detecting the start of the voltage transient.

15. The photovoltaic solar power module of claim 10, wherein at least one detection circuit includes a means for determining when the anode-to-cathode voltage in at least one photovoltaic subunit is relatively greater than a third predetermined threshold.

16. The photovoltaic solar power module of claim 10, wherein at least one detection circuit includes a means for determining when the anode-to-cathode voltage in at least one photovoltaic subunit changes at a rate that is relatively greater than a fourth predetermined threshold.

17. The photovoltaic solar power module of claim 10, wherein at least one detection circuit includes a means for determining when the voltage between the positive power terminal and the negative power terminal is relatively greater than a third predetermined threshold.

18. The photovoltaic solar power module of claim 10, wherein at least one detection circuit includes a means for determining when the voltage between the positive power terminal and the negative power terminal changes at a rate that is relatively greater than a fourth predetermined threshold.

19. The photovoltaic solar power module of claim 10, wherein the power management circuit comprises a timer circuit for determining when to open the switch in each photovoltaic subunit after the voltage transient.

20. The photovoltaic solar power module of claim 10, wherein the power management circuit comprises a means for determining when the voltage across the capacitor is relatively lesser than a fifth predetermined threshold.

21. An active bypass diode circuit for photovoltaic solar power modules, comprising:
   a diode having anode and cathode terminals, for bypassing at least one photovoltaic cell in a solar power module;
   a switch coupled in parallel with the diode;
   a detection circuit for detecting a voltage transient across the diode;
   a control circuit for operating the switch, the control circuit closing the switch in response to the voltage transient across the diode;
   a power management circuit for determining when to open the switch after the voltage transient;
   a capacitor for storing energy; and
   a power supply circuit disposed to receive power from at least one photovoltaic cell in the solar power module, and provide power to at least the capacitor, the control circuit, and the power management circuit.

* * * * *